United States Patent
Mekkat et al.

(10) Patent No.: US 9,996,356 B2
(45) Date of Patent: Jun. 12, 2018

(54) METHOD AND APPARATUS FOR RECOVERING FROM BAD STORE-TO-LOAD FORWARDING IN AN OUT-OF-ORDER PROCESSOR

(71) Applicant: Intel Corporation, Santa Clara, CA (US)

(72) Inventors: Vineeth Mekkat, San Jose, CA (US); Oleg Margulis, Los Gatos, CA (US); Jason M. Agron, San Jose, CA (US); Ethan Schuchman, Santa Clara, CA (US); Sebastian Winkel, Los Altos, CA (US); Youfeng Wu, Palo Alto, CA (US); Gisle Dankel, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 14/998,299

(22) Filed: Dec. 26, 2015

(65) Prior Publication Data
US 2017/0185404 A1   Jun. 29, 2017

(51) Int. Cl.
*G06F 9/30* (2018.01)
*G06F 9/38* (2018.01)

(52) U.S. Cl.
CPC ........ *G06F 9/30185* (2013.01); *G06F 9/3826* (2013.01); *G06F 9/3834* (2013.01); *G06F 9/3838* (2013.01); *G06F 9/3865* (2013.01)

(58) Field of Classification Search
None
See application file for complete search history.

(56) References Cited

U.S. PATENT DOCUMENTS

| | | | |
|---|---|---|---|
| 6,021,485 A * | 2/2000 | Feiste | G06F 9/3816 712/216 |
| 6,128,775 A | 10/2000 | Chow et al. | |
| 6,230,254 B1 * | 5/2001 | Senter | G06F 9/3004 712/206 |
| 6,564,297 B1 | 5/2003 | Kosche | |
| 6,651,161 B1 | 11/2003 | Keller et al. | |

(Continued)

OTHER PUBLICATIONS

International Search Report and Written Opinion for Application No. PCT/US2016/063890, dated Jun. 9, 2017, 17 pages.

(Continued)

*Primary Examiner* — Eric Coleman
(74) *Attorney, Agent, or Firm* — Nicholson De Vos Webster & Elliott LLP

(57) ABSTRACT

Apparatus and method for detecting and recovering from incorrect memory dependence speculation in an out-of-order processor are described herein. For example, one embodiment of a method comprises: executing a first load instruction; detecting when the first load instruction experiences a bad store-to-load forwarding event during execution; tracking the occurrences of bad store-to-load forwarding event experienced by the first load instruction during execution; controlling enablement of an S-bit in the first load instruction based on the tracked occurrences; generating a plurality of load operations responsive to an enabled S-bit in first load instruction, wherein execution of the plurality of load operations produces a result equivalent to that from the execution of the first load instruction.

14 Claims, 14 Drawing Sheets

(56) References Cited

U.S. PATENT DOCUMENTS

| | | | | |
|---|---|---|---|---|
| 6,662,280 | B1* | 12/2003 | Hughes | G06F 8/4442 |
| | | | | 711/118 |
| 9,442,735 | B1* | 9/2016 | Jamil | G06F 9/3826 |
| 9,535,695 | B2* | 1/2017 | Mylius | G06F 9/30043 |
| 2003/0065908 | A1* | 4/2003 | Patel | G06F 9/3826 |
| | | | | 712/214 |
| 2010/0106872 | A1 | 4/2010 | Moyer et al. | |
| 2012/0102357 | A1 | 4/2012 | Ramani et al. | |
| 2014/0281408 | A1* | 9/2014 | Zeng | G06F 9/30043 |
| | | | | 712/216 |
| 2015/0067305 | A1* | 3/2015 | Olson | G06F 9/3836 |
| | | | | 712/225 |
| 2015/0095629 | A1* | 4/2015 | Abdallah | G06F 9/30043 |
| | | | | 712/245 |

OTHER PUBLICATIONS

Soumyadeep, et al., "Enabling Efficient Alias Speculation," Lctes'15, Proceedings of the 16th ACM SIGPLAN/SIGBED Conference on Languages, Compilers and Tools for Embedded Systems 2015, Article No. 7, Jun. 18-19, 2015, pp. 1-10.

* cited by examiner

| ID | Instruction | Counter | Threshold |
|---|---|---|---|
| 1 | Load 1 | 6 | 10 |
| 2 | Load 2 | 10 | 10 |
| 3 | Load 3 | 7 | 5 |
| 4 | Load 4 | 8 | 12 |
| . | . | . | . |
| . | . | . | . |
| . | . | . | . |
| n | Load n | x | y |

FIG. 4B

| ID | Instruction | Counter |
|---|---|---|
| 1 | Load 1 | 6 |
| 2 | Load 2 | 10 |
| 3 | Load 3 | 7 |
| 4 | Load 4 | 8 |
| . | . | . |
| . | . | . |
| . | . | . |
| n | Load n | x |

FIG. 4A

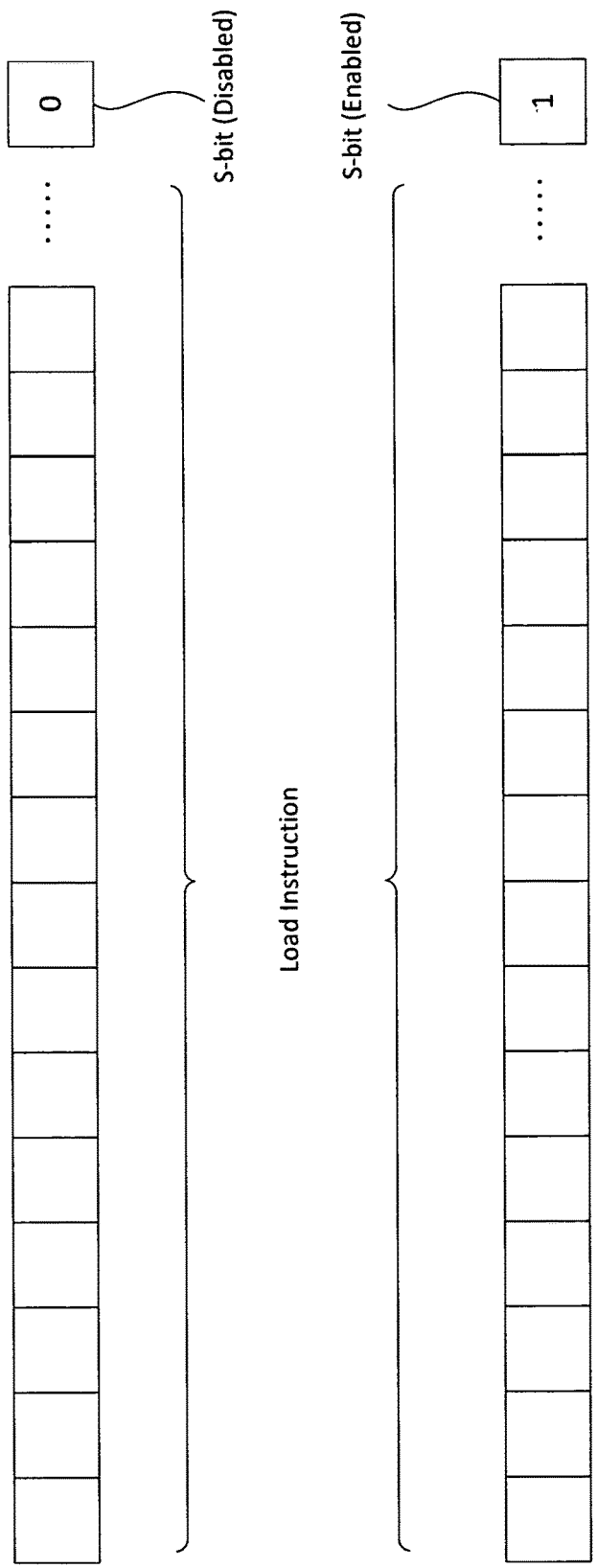

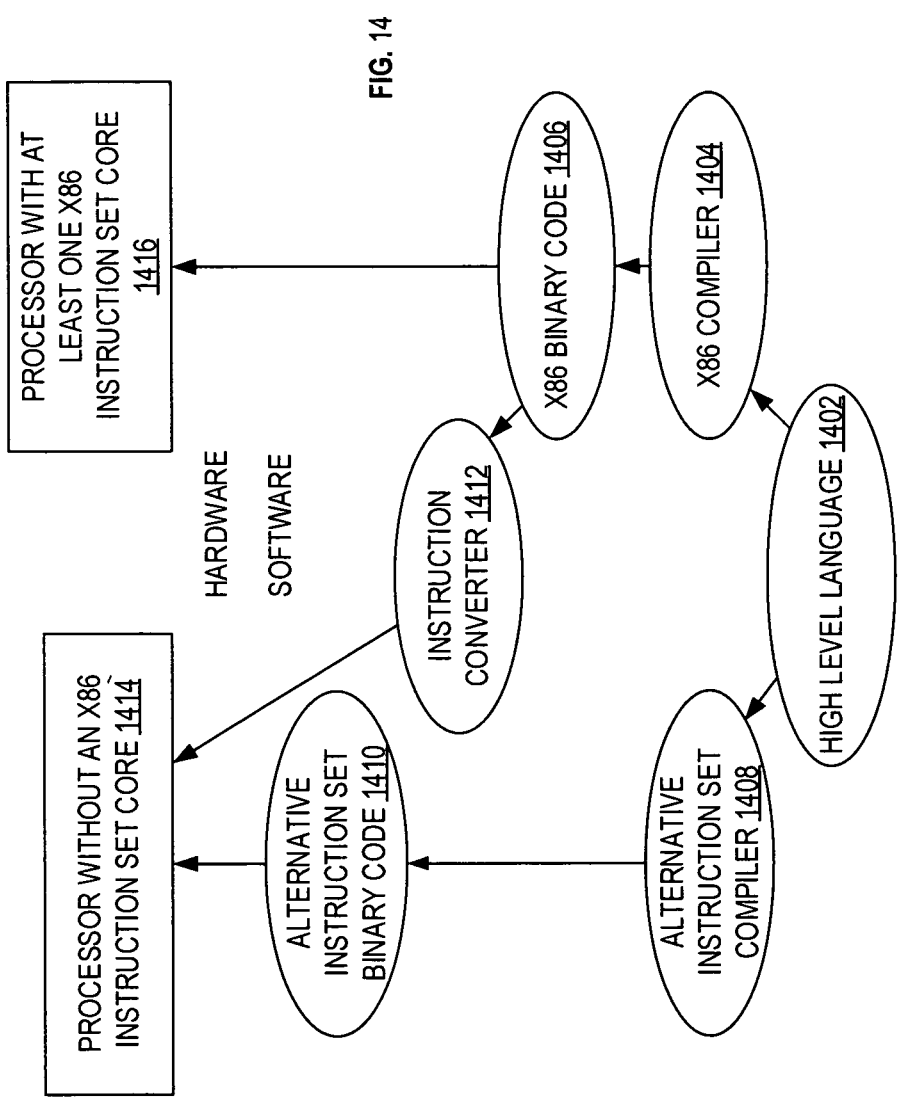

METHOD AND APPARATUS FOR RECOVERING FROM BAD STORE-TO-LOAD FORWARDING IN AN OUT-OF-ORDER PROCESSOR

BACKGROUND

Field of the Invention

This invention relates generally to the field of computer processors. More particularly, the invention relates to an apparatus and method for recovering from a bad store-to-load forwarding in an out-of-order processor.

Description of the Related Art

In pipelined execution systems, instruction are fetched, decoded, and executed speculatively. Techniques such as reordering of memory operations (e.g., hoisting of loads over older stores), removal of duplicate load instructions, and use of store-to-load forwarding have proven to be effective mechanisms for improving the performance of Out-of-Order (OoO) microprocessors. Associated with speculative execution of instructions are rules to be observed and means to detect when these rules are violated so that appropriative corrective measures can be taken. Additionally, it would be beneficial if the outcome of certain instructions (e.g., bad loads) can be predicted before they are executed.

For example, in the context of store-to-load forwarding, current implementations are typically restricted to only fully overlapped store/load accesses where an older store buffer entry completely covers the region of memory being read by a younger load instruction. In cases where store/load accesses overlap only partially or are of different sizes, such that the younger load instruction attempts to access a region of memory not covered by the older store buffer entry, the store-to-load forwarding mechanism would fail. This often leads to the processor stalling until the offending conditions are cleared which, consequently, causes degradation in performance. Moreover, as no history or memory is kept for bad store-to-load forwarding occurrences, a bad load instruction is detected only when a lookup in the store-buffer is performed at runtime. This often leads to unnecessary/duplicative lookups and imposes additional power and performance cost that could have been avoided.

BRIEF DESCRIPTION OF THE DRAWINGS

A better understanding of the present invention can be obtained from the following detailed description in conjunction with the following drawings, in which:

FIG. 4A illustrates a CAM table according to an embodiment;

FIG. 4B illustrates a CAM table that utilizes a threshold field according to an embodiment;

FIG. 5A illustrates a load instruction with a disabled S-bit according to an embodiment;

FIG. 5B illustrates a load instruction with an enabled S-bit according to an embodiment;

FIG. 14 illustrates a block diagram contrasting the use of a software instruction converter to convert binary instructions in a source instruction set to binary instructions in a target instruction set according to embodiments of the invention;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention, may be practiced without some of these specific details. In other instances, well-known structures and devices are shown in block diagram form to avoid obscuring the underlying principles of the embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Embodiments of apparatus and methods for detecting and recovering from incorrect memory dependence speculation in an out-of-order processor are described herein. One embodiment reduces bad store-to-load forwarding occurrences due to incomplete overlap of store/load accesses or mismatched access sizes, by predicting whether an offending load instruction should be split into two or more instructions in order to match the store instruction's access size. According to an embodiment, a history of bad store-to-load forwarding occurrences is maintained to enable efficient prediction and identification of an offending load instruction before it causes a bad store-to-load forwarding event. For example, an S-bit may be incorporated into every load instruction to indicate whether or not a given load instruction should be split in the front-end of the pipeline. Initially, the S-bit is disabled (i.e., set to 0). When a bad store-to-load forwarding issue is detected, an exception is raised causing the enablement of the S-bit (i.e., set to 1) in the offending load instruction. An enabled S-bit indicates that a load instruction should be split in the front-end of the pipeline to avoid the risk of causing another bad store-to-load forwarding event. As such, the next time the same load instruction executes, it will be split in the front-end of the pipeline to match the access size of a previously executed store instruction in the store queue.

Figure 1:
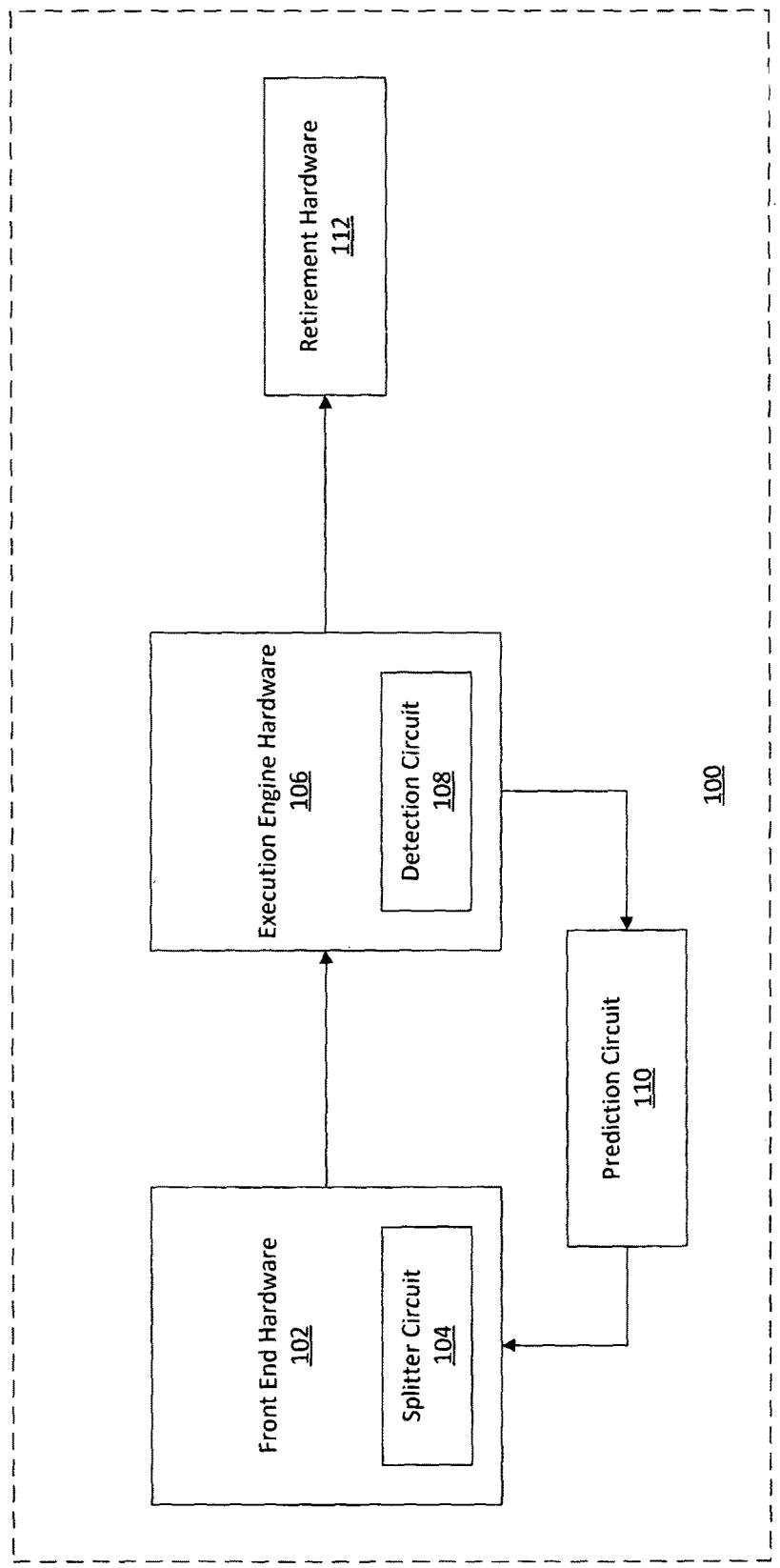
FIG. 1 is a block diagram of an execution core according to one embodiment of the present invention.

FIG. 1 is a block diagram of an execution core pipeline 100 according to an embodiment of the present invention. The core 100 includes a front end hardware 102 coupled to an execution engine hardware 106, which is coupled to a prediction circuit 110 and a retirement hardware 112. The front end hardware 102 provides instructions to the Execution Hardware 106 to be executed. In one embodiment, the front end hardware 102 further includes a Binary Translator (BT) that translates source code into register instructions and caches the translated instructions in a translation cache. In one embodiment, a splitter circuit 104 is included in the front end hardware 102 for splitting instructions. In another embodiment (not illustrated), the splitter circuit 104 is a separate hardware coupled to the front end hardware 102 and the execution engine hardware 106. When a "marked" (e.g. S-bit=1) instruction is received or detected in the front end hardware 102, the splitter circuit 104 responsively splits the "marked" instruction by generating two or more alternate instructions based on the "marked" instruction. When executed individually by the execution engine hardware 106, the two or more alternate instructions produce results that, when merged, are equivalent to the result from executing the "marked" instruction.

The execution engine hardware 106 is coupled to receive instructions from the front end hardware 102. In one embodiment, the execution engine hardware 106 includes a detection circuit 108 for detecting bad store-to-load forwarding event. In another embodiment (not illustrated), the detection circuit 108 is a separate hardware coupled to the execution engine hardware 106 and the prediction circuit 110. The detection circuit 108, upon detecting the occurrence of a bad store-to-load forwarding event during the execution of a load instruction, responsively indicates the occurrence to the prediction circuit 110. The prediction circuit 110, which is coupled to receive indications from the detection circuit 108, tracks the occurrences of bad store-to-load forwarding event and predicts whether a given instruction should be split in the front-end the next time it is executed.

Figure 2:
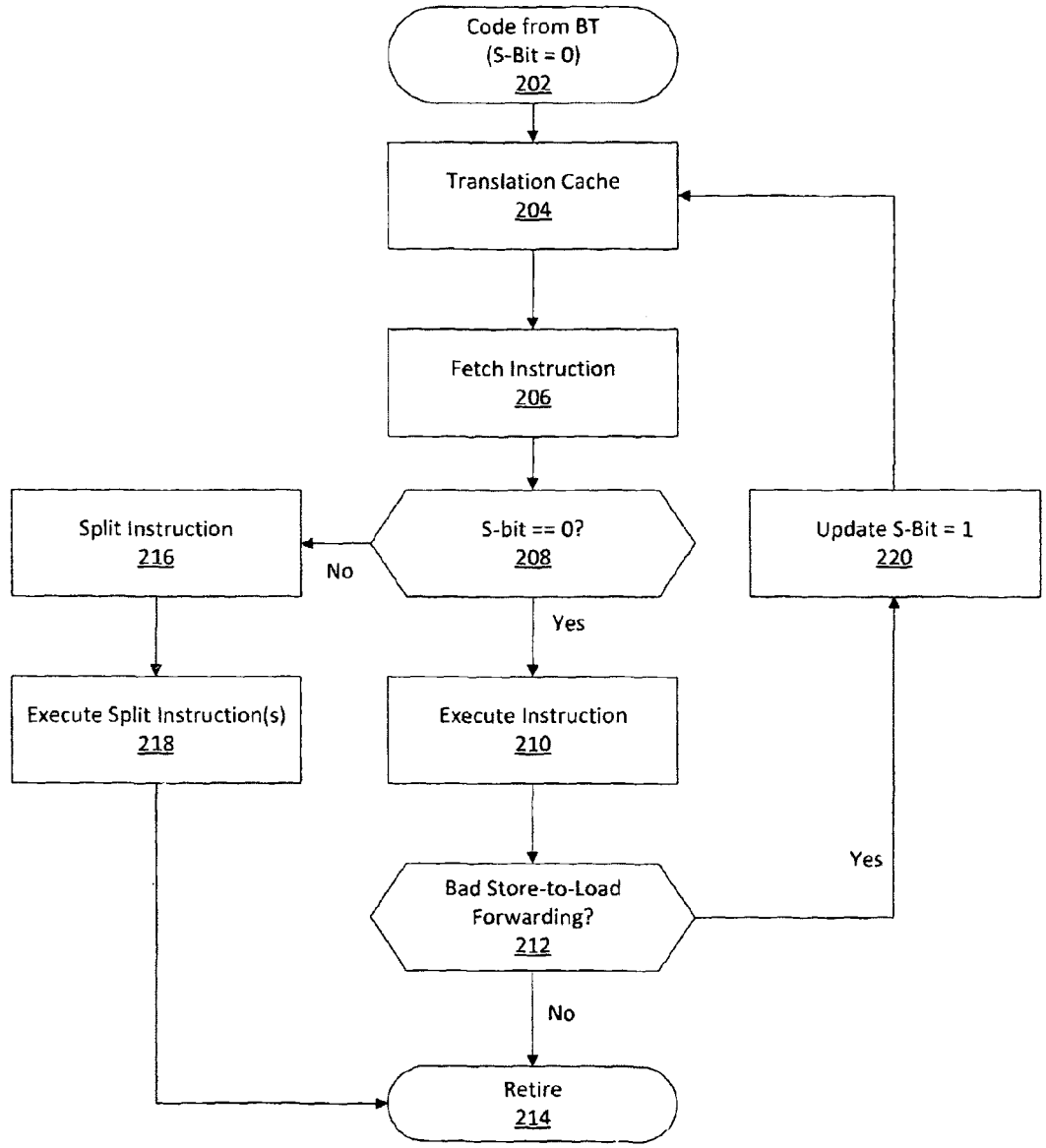
FIG. 2 is a flow diagram illustrating the operation and logic of the present invention according one embodiment.

FIG. 2 is a flow diagram of the operation and logic of the present invention according to one embodiment. In block 202, a binary translator in the front end hardware translates source code into instructions, such as loads and stores. A disabled S-bit (e.g., S=0) is added to each instruction. In block 204, the translated instructions are stored in a translation cache. In block 206, an instruction, such as a load, is fetched from the translation cache. In block 208, a splitter circuit checks whether or not the fetched instruction's S-bit is enabled. If the S-bit is not enabled (e.g., S=0), the execution hardware executes the instruction in block 210. In block 212, a detection circuit detects whether or not a bad store-to-load forwarding event occurred as a result of executing the instruction. In the absence of a detected bad store-to-load forwarding event, the instruction is retired and the results from the execution is committed or written back to cache/memory in block 214. However, if a bad store-to-load forwarding event was detected in block 212, the results from the execution is purged and an indication of the occurrence, along with the instruction, is sent to a prediction circuit. The prediction circuit, in response, updates the instruction by enabling the instruction's S-bit (e.g., set S=1) at block 220. The updated instruction with an enabled S-bit is then reinserted into the translation cache at 204. Thereafter, the updated instruction is fetched again in block 206. In block 208, the S-bit of the updated instruction is examined. This time, since the S-bit of the updated instruction is enabled (e.g., S=1), the updated instruction is split into one or more alternate instructions in block 216. At block 218, each of the alternate instructions is executed by the execution engine circuit. In block 214, the executed alternate instructions are retired and the results from which are committed or written back to cache/memory.

Figure 3:
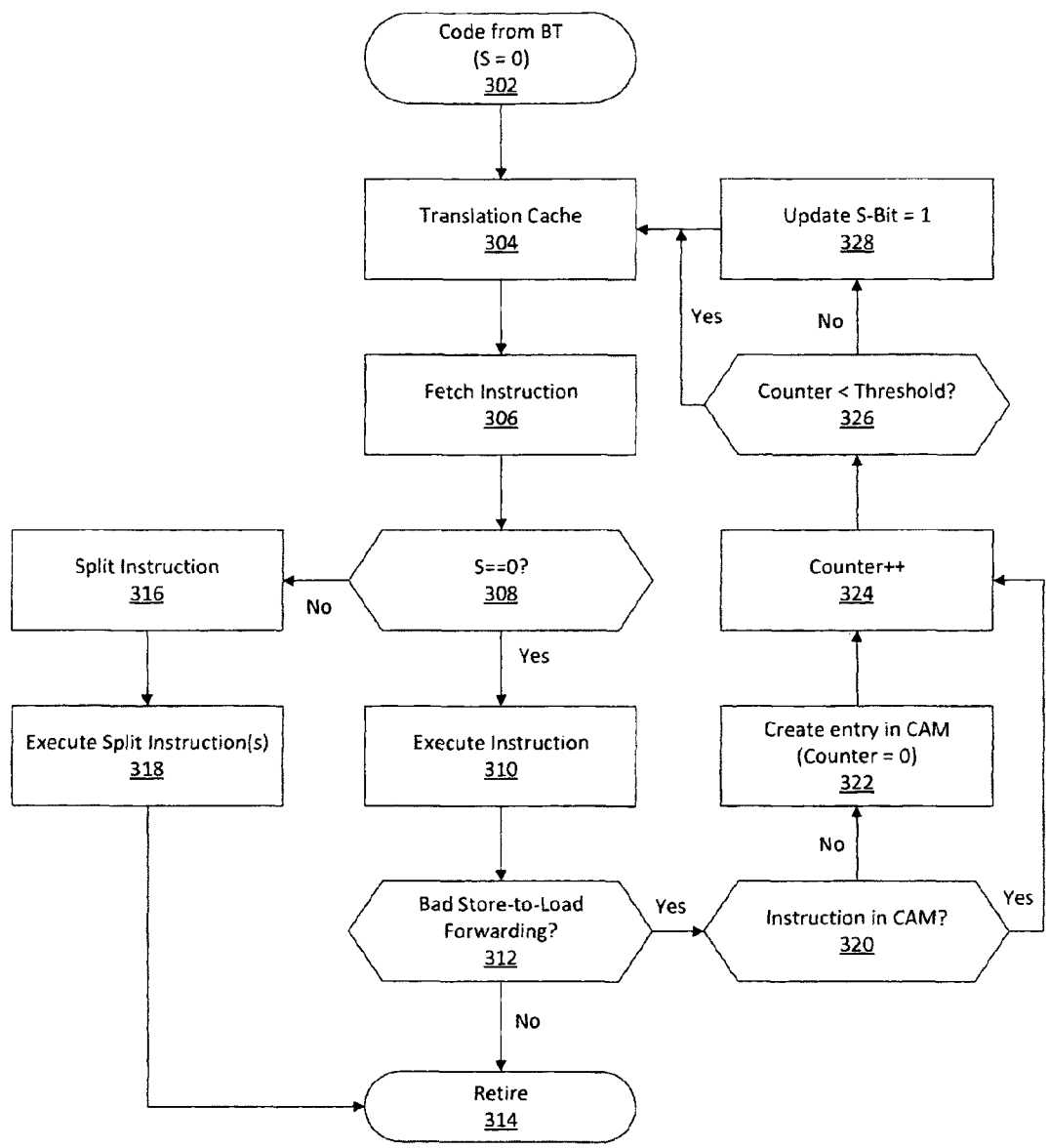
FIG. 3 a flow diagram illustrating the operation and logic of the present invention utilizing a CAM table according one embodiment.

FIG. 3 is a flow diagram similar to FIG. 2, illustrating the operation and logic of the present invention according to another embodiment. However, unlike FIG. 2, a content addressable memory (CAM) lookup table is implemented by the prediction circuit in FIG. 3. In block 302, a binary translator in the front end hardware translates source code into instructions. A disabled S-bit (e.g., S=0) is added to instructions. In block 304, the instructions containing the S-bit are stored in a translation cache. In block 306, an instruction, such as a load, is fetched from the translation cache. In block 308, a splitter circuit checks whether or not the fetched instruction's S-bit is enabled. If the S-bit is not enabled (e.g., S=0), the execution hardware executes the instruction in block 310. In block 312, a detection circuit detects whether or not a bad store-to-load forwarding event occurred during the execution of the instruction. In the absence of a detected bad store-to-load forwarding event, the executed instruction is retired and the results from the execution is committed or written back to cache/memory in block 314. However, if a bad store-to-load forwarding event was detected in block 312, the results from execution of the instruction is purged and an indication of the occurrence, along with the instruction, is sent to a prediction circuit. In block 320, the prediction circuit determines if the instruction has a corresponding entry in a CAM table. If no matching entry was found in CAM, a new entry corresponding to the instruction is created in the CAM table at block 322. The new entry to include a counter initially set to 0. Next, in block 324, the counter of the entry corresponding to the instruction is incremented. In block 326, the counter is compared with a pre-determined threshold associated with to the entry. The pre-determined threshold may be different for each entry in the CAM table according to an embodiment. Alternatively, the pre-determined threshold could be the same across all CAM entries according to another embodiment. If the incremented counter exceeds the pre-determined threshold, the S-bit of the instruction corresponding to the entry is enabled (e.g., set S=1) at block 328. The updated instruction is then sent to and stored in the translation cache. On the other hand, if the incremented counter does not exceed the pre-determined threshold, the instruction is reinserted into the translation case with no further action taken.

Thereafter, the updated instruction is fetched again in block 306 to be executed. In block 308, the S-bit of the instruction is examined. If the S-bit of the updated instruction is enabled (e.g., S=1), the updated instruction is split into one or more alternate instructions in block 316. At block 318, each of the alternate instructions is executed by the execution engine circuit. In block 314, the executed alternate instructions are retired and the results from which are committed or written back to cache/memory.

FIG. 4A illustrates the CAM table according to an embodiment. Each instruction stored in the CAM table has an associated counter to keep track of the number of bad store-to-forwarding events experienced by the instruction. In another embodiment, as illustrated by FIG. 4B, the CAM table further includes a threshold field for each table entry to store the threshold value associated with each instruction in the CAM table. The threshold determines the maximum (or minimum) number of bad store-to-load forwarding events experienced by the load instruction before the instruction's S-bit is enabled. FIG. 5A and FIG. 5B illustrate exemplary load instructions containing the S-bit. The S-bit for the load instruction is disabled (set to 0) in FIG. 5A and enabled (set to 1) in FIG. 5B.

In yet another embodiment a hardware alias table is implemented to track speculatively hoisted load instructions and to verify them against all store instructions for memory access overlaps or aliasing. In one embodiment, a software mechanism identifies all speculated instructions that need additional verification and passes this information to a hardware component as annotations in the code. The hardware component then performs correctness checks at run-time according to the annotated codes. In accordance with the embodiment, every speculated memory access (i.e., a load or store instruction) that cannot be statically proven to be safe is entered into the hardware alias table and marked as a "protected" instruction. Every instruction that modifies a memory location (i.e. a store instruction) is checked against all actively protected instructions for memory access overlap (i.e., aliasing). As will be described in detail below, every executed store instruction that defines the bounds of an alias set (i.e., protection range) clears the "protected" status for all instructions inside that alias set. An instruction that has been cleared of the "protected" status is deemed safe and becomes inactive in the hardware alias table. According to an embodiment, every load instructions in an alias set, as well as the associated store instruction that defines the alias set, will include additional annotations to identify protection status and alias set information. The annotation may be done by software or hardware. In one embodiment, the annotations are added to the instructions by a binary translator in the front end hardware.

Each alias set comprises a group of speculated memory accesses (i.e., load instructions) and is defined by a memory-modifying instruction (i.e., store instruction). According to one embodiment, each alias set is defined by the youngest store among all the store instructions over which one or more memory accesses (i.e., load instruction) speculated over. For example, consider the code snippet below:

1) st % r1, [% r2]
2) ld % r3, [% r4]
3) st % r5, [% r5]
4) st % r6, [% r7]
5) ld % r8, [% r5+4]
6) ld % r9, [% r6+3]

When speculatively hoisting all load instructions over store instructions, load instruction 2 would speculate over store instruction 1 and load instructions 5 and 6 would speculate over store instructions 1, 3, and 4, resulting in:

2) ld % r3, [% r4]
5) ld % r8, [% r5+4]
6) ld % r9, [% r6+3]
1) st % r1, [% r2]
3) st % r5, [% r5]
4) st % r6, [% r7]

As such, instruction 2 belongs to an alias set associated with boundary-defining instruction 1 because instruction 1 is the only memory-modifying instruction (i.e. store instruction) speculated over by instruction 2. Instructions 5 and 6 belong to an alias set associated with boundary-defining instruction 4, as instruction 4 is the youngest of all store instructions (i.e., instructions 1, 3, and 4) that were speculated over by instructions 5 and 6. Instruction 4 is the youngest out of instructions 1, 3, and 4 because it would have been executed later in the sequence if the instructions had been executed in order. Speculatively hoisting instructions 2, 5, and 6 thus creates two alias sets, each associated with a store instruction defining the alias set.

2) ld % r3, [% r4]—Alias Set 0
5) ld % r8, [% r5+4]—Alias Set 1
6) ld % r9, [% r6+3]—Alias Set 1
1) st % r1, [% r2]—Defines Alias Set 0
3) st % r5, [% r5]
4) st % r6, [% r7]—Defines Alias Set 1

As mentioned above, the hoisted loads will be protected and the execution of alias-set-defining stores will clear that protection for the hoisted loads in the alias set. Every intervening store (such as instruction 3) will also be checked against all active protected loads for memory overlap or aliasing. The resulting, annotated code are as follows:

2) ld.p.0 % r3, [% r4]—Alias Set 0
5) ld.p.1 % r8, [% r5+4]—Alias Set 1
6) ld.p.1 % r9, [% r6+3]—Alias Set 1
1) st.cl.0 % r1, [% r2]—Defines Alias Set 0
3) st % r5, [% r5]
4) st.cl.1 % r6, [% r7]—Defines Alias Set 1

The ".p" annotation indicates protection and ".cl" indicates clearing. The number associated with annotation indicates the alias set associated with the operation.

Figure 6:
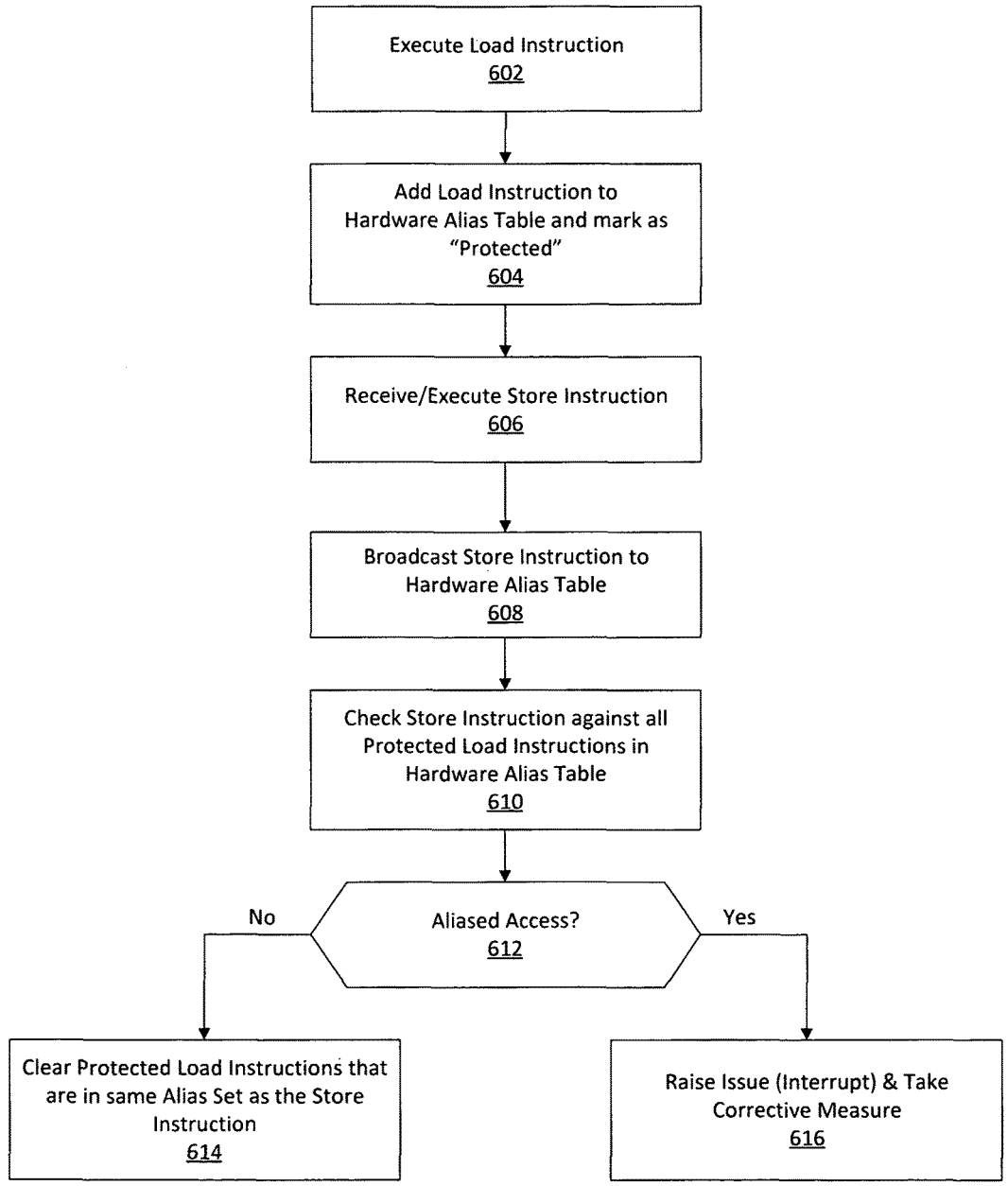
FIG. 6 is a block diagram illustrating the operation and logic for implementing a hardware alias table according to an embodiment.

FIG. 6 is a block diagram illustrating the operation and logic of the present invention according to an embodiment. At block 602, the execution engine hardware speculatively executes all load instructions. At block 604, every speculatively executed load instruction that cannot be statically proven to be safe is marked as a "protected" instruction and added to a hardware alias table. At block 606, the execution engine receives and executes a store instruction. The executed store instruction is passed to the hardware alias table at block 608. At block 610, the hardware alias table receives the store instruction and checks it against all "protected" load instruction in the table for possible memory access overlaps (aliasing). At block 612, a determination of is made on whether any access overlap (aliasing) is detected. If no such violation is detected, protected load instructions that are in the same alias set as the executed store instruction are cleared in block 614. If no alias information is associated with the executed store instruction, such as an intervening store (e.g., instruction 3 from example described above), no protected load instructions are cleared. However, if access overlap (aliasing) was detected in 612, a fault or interrupt is reported to the front end hardware as a disruption with a specific signal in block 616. In response to receiving the disruption signal, the front end hardware takes corrective measures, such as retranslation of code without the specific speculations, to prevent the same alias fault in the future.

Figure 7:
FIG. 7 illustrates an exemplary hardware alias table according to an embodiment.

FIG. 7 is an exemplary hardware alias table according to an embodiment. Each table entry corresponds to a speculatively executed load instruction that needs further correction verification. The physical and logical address being accessed by the load instruction, as well as the alias set the instruction belongs to, are stored in the entry. Each entry further includes a "Protected" field to indicate whether the corresponding instruction should be checked against store instructions. The "Protected" field is enabled or marked (i.e., set to 1) when an entry is first inserted into the table. Thereafter, as the speculatively executed load instruction is verified and cleared by an alias set defining store instruction, the "protected" field is disabled or unmarked (i.e., set to 0). An entry with the "protected" field disabled becomes inactive and no longer needs to be verified against subsequent stores. The load instruction associated with an inactive entry is deemed safe.

Figure 8:
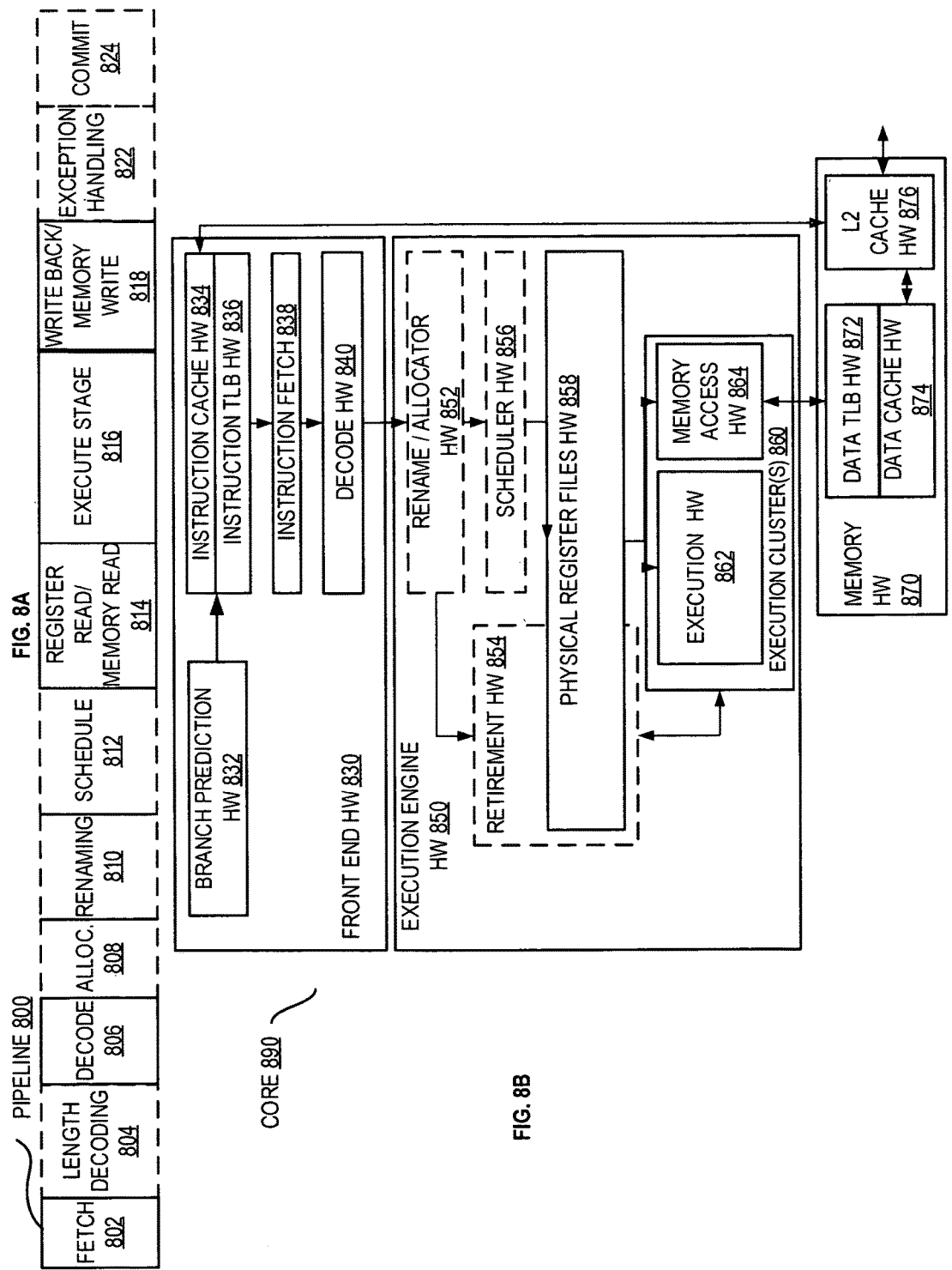
FIG. 8A is a block diagram illustrating both an exemplary in-order pipeline and an exemplary register renaming, out-of-order issue/execution pipeline according to embodiments of the invention.
FIG. 8B is a block diagram illustrating both an exemplary embodiment of an in-order architecture core and an exemplary register renaming, out-of-order issue/execution architecture core to be included in a processor according to embodiments of the invention.

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end hardware 830 coupled to an execution engine hardware 850, and both are coupled to a memory hardware 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end hardware 830 includes a branch prediction hardware 832 coupled to an instruction cache hardware 834, which is coupled to an instruction translation lookaside buffer (TLB) 836, which is coupled to an instruction fetch hardware 838, which is coupled to a decode hardware 840. The decode hardware 840 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode hardware 840 or otherwise within the front end hardware 830). The decode hardware 840 is coupled to a rename/allocator hardware 852 in the execution engine hardware 850.

The execution engine hardware 850 includes the rename/allocator hardware 852 coupled to a retirement hardware 854 and a set of one or more scheduler hardware 856. The scheduler hardware 856 represents any number of different schedulers, including reservations stations, central instruction window, etc. The scheduler hardware 856 is coupled to the physical register file(s) hardware 858. Each of the physical register file(s) hardware 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 858 comprises a vector registers hardware, a write mask registers hardware, and a scalar registers hardware. These register hardware may provide architectural vector registers, vector mask registers, and general purpose registers. The physical register file(s) hardware 858 is overlapped by the retirement hardware 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 854 and the physical register file(s) hardware 858 are coupled to the execution cluster(s) 860. The execution cluster(s) 860 includes a set of one or more execution hardware 862 and a set of one or more memory access hardware 864. The execution hardware 862 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 856, physical register file(s) hardware 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 864). It should also be understood that where separate pipelines are used, one or more of these pipelines may be out-of-order issue/execution and the rest in-order.

The set of memory access hardware 864 is coupled to the memory hardware 870, which includes a data TLB hardware 872 coupled to a data cache hardware 874 coupled to a level 2 (L2) cache hardware 876. In one exemplary embodiment, the memory access hardware 864 may include a load hardware, a store address hardware, and a store data hardware, each of which is coupled to the data TLB hardware 872 in the memory hardware 870. The instruction cache hardware 834 is further coupled to a level 2 (L2) cache hardware 876 in the memory-hardware 870. The L2 cache hardware 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode hardware 840 performs the decode stage 806; 3) the rename/allocator hardware 852 performs the allocation stage 808 and renaming stage 810; 4) the scheduler hardware 856 performs the schedule stage 812; 5) the physical register file(s) hardware 858 and the memory hardware 870 perform the register read/memory read stage 814; the execution cluster 860 perform the execute stage 816; 6) the memory hardware 870 and the physical register file(s) hardware 858 perform the write back/memory write stage 818; 7) various hardware may be involved in the exception handling stage 822; and 8) the retirement hardware 854 and the physical register file(s) hardware 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 834/874 and a shared L2 cache hardware 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9:
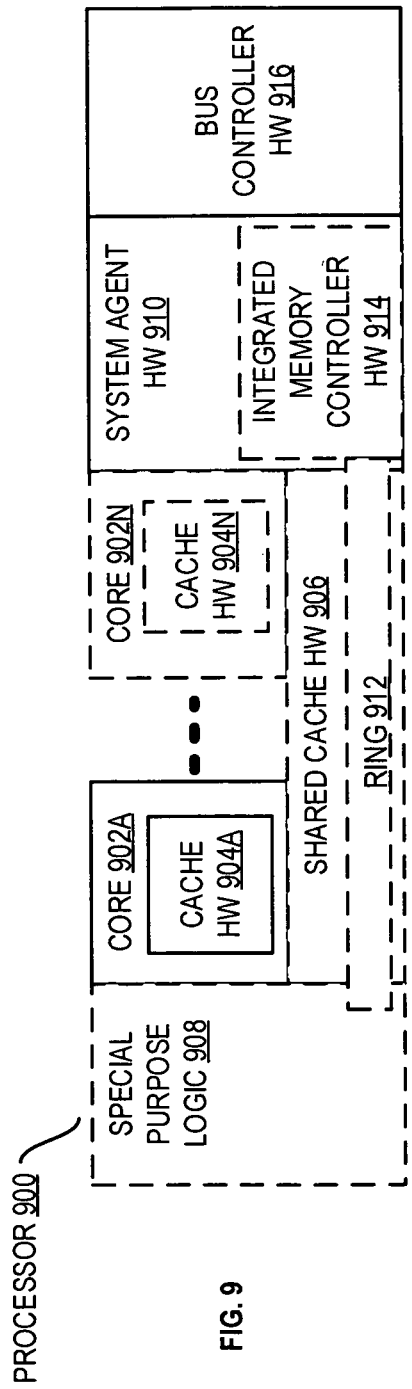
FIG. 9 is a block diagram of a single core processor and a multicore processor with integrated memory controller and graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller hardware 916, while the optional addition of the dashed lined boxes illustrates an alternative processor 900 with multiple cores 902A-N, a set of one or more integrated memory controller hardware 914 in the system agent hardware 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 906, and external memory (not shown) coupled to the set of integrated memory controller hardware 914. The set of shared cache hardware 906 may include one or more mid-level caches, such as level 2 (L2), level 3 (L3), level 4 (L4), or other levels of cache, a last level cache (LLC), and/or combinations thereof. While in one embodiment a ring based interconnect hardware 912 interconnects the integrated graphics logic 908, the set of shared cache hardware 906, and the system agent hardware 910/integrated memory controller hardware 914, alternative embodiments may use any number of well-known techniques for interconnecting such hardware. In one embodiment, coherency is maintained between one or more cache hardware 906 and cores 902-A-N.

In some embodiments, one or more of the cores 902A-N are capable of multi-threading. The system agent 910 includes those components coordinating and operating cores 902A-N. The system agent hardware 910 may include for example a power control unit (PCU) and a display hardware. The PCU may be or include logic and components needed for regulating the power state of the cores 902A-N and the integrated graphics logic 908. The display hardware is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set. In one embodiment, the cores 902A-N are heterogeneous and include both the "small" cores and "big" cores described below.

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
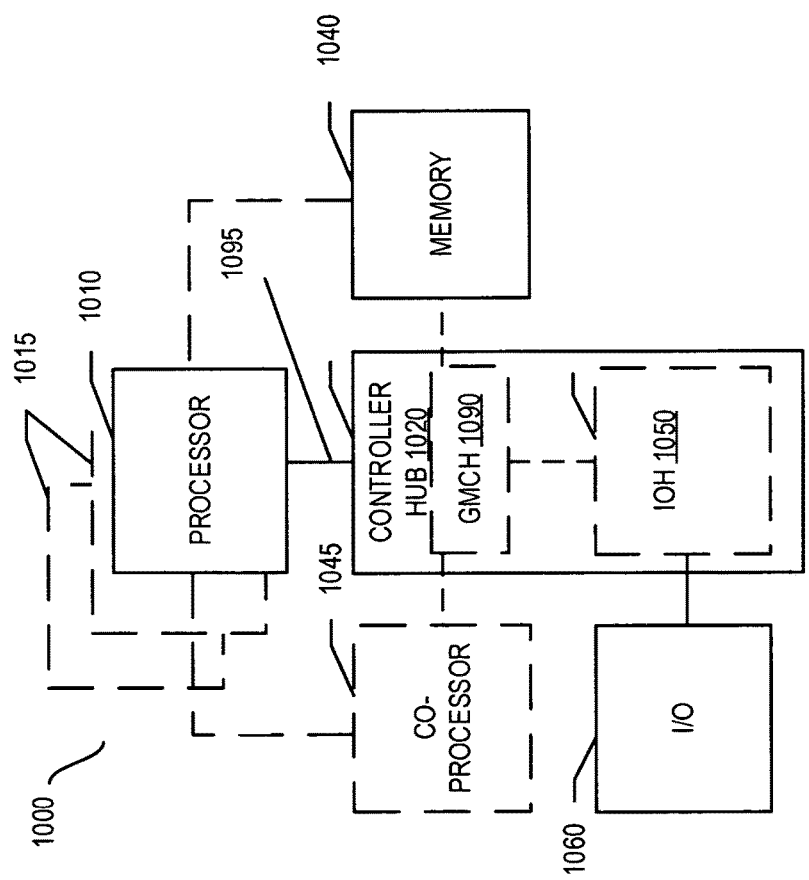
FIG. 10 illustrates a block diagram of a system in accordance with one embodiment of the present invention.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface, or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
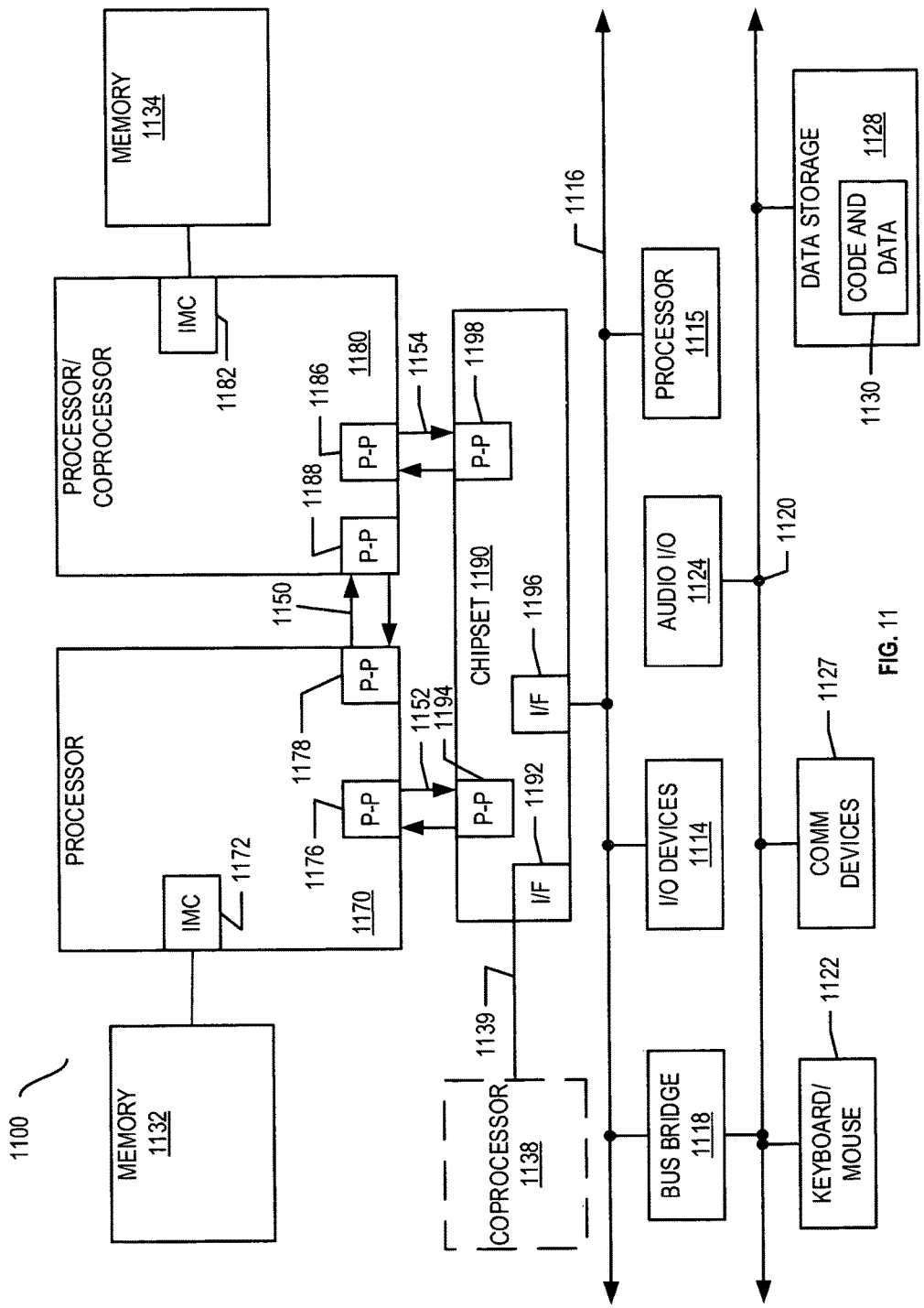
FIG. 11 illustrates a block diagram of a second system in accordance with an embodiment of the present invention.

Referring now to FIG. 11, shown is a block diagram of a first more specific exemplary system 1100 in accordance with an embodiment of the present invention. As shown in FIG. 11, multiprocesor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) hardware 1172 and 1182, respectively. Processor 1170 also includes as part of its bus controller hardware point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) hardware), field programmable gate arrays; or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage hardware 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
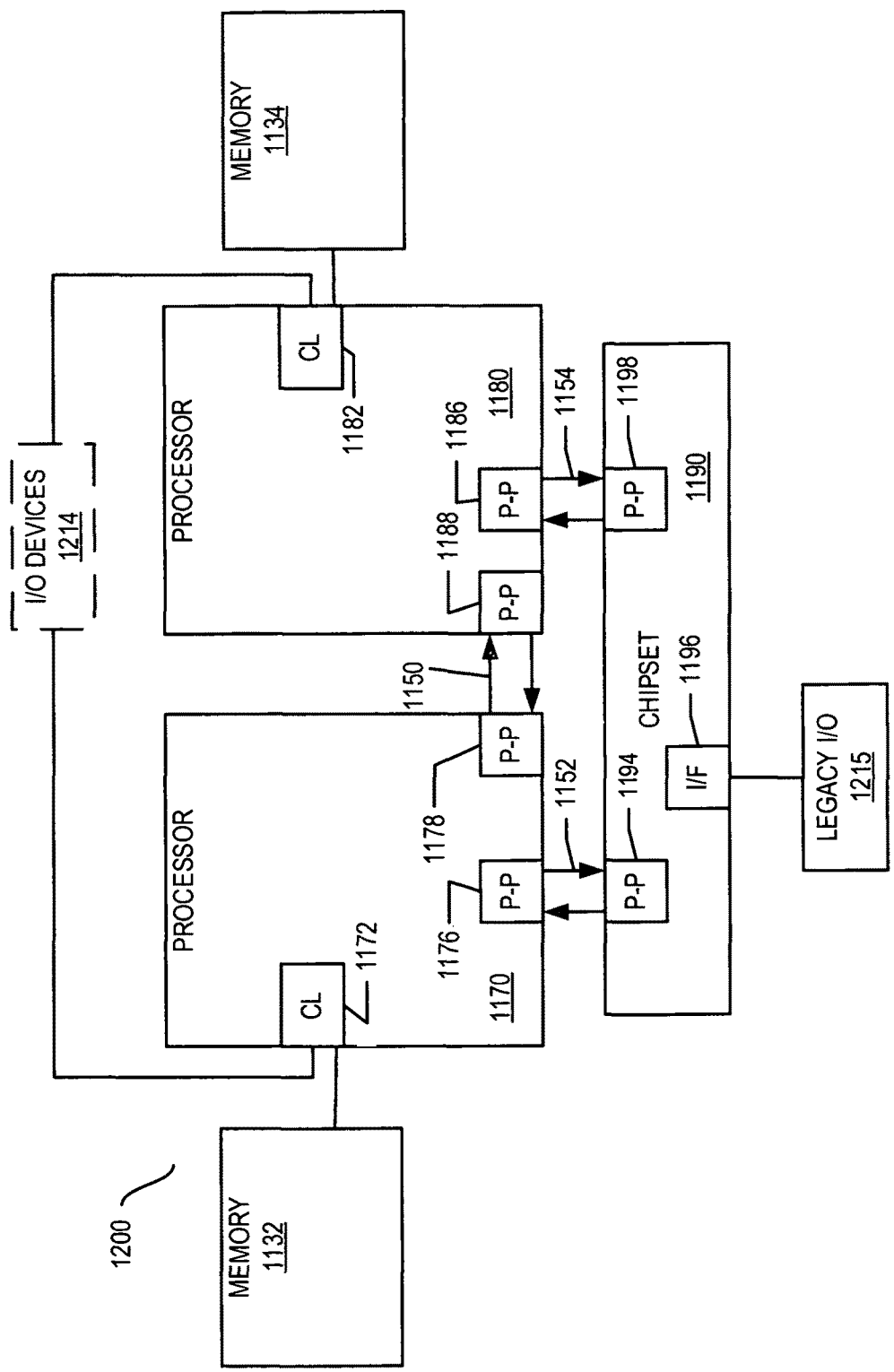
FIG. 12 illustrates a block diagram of a third system in accordance with an embodiment of the present invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller hardware and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
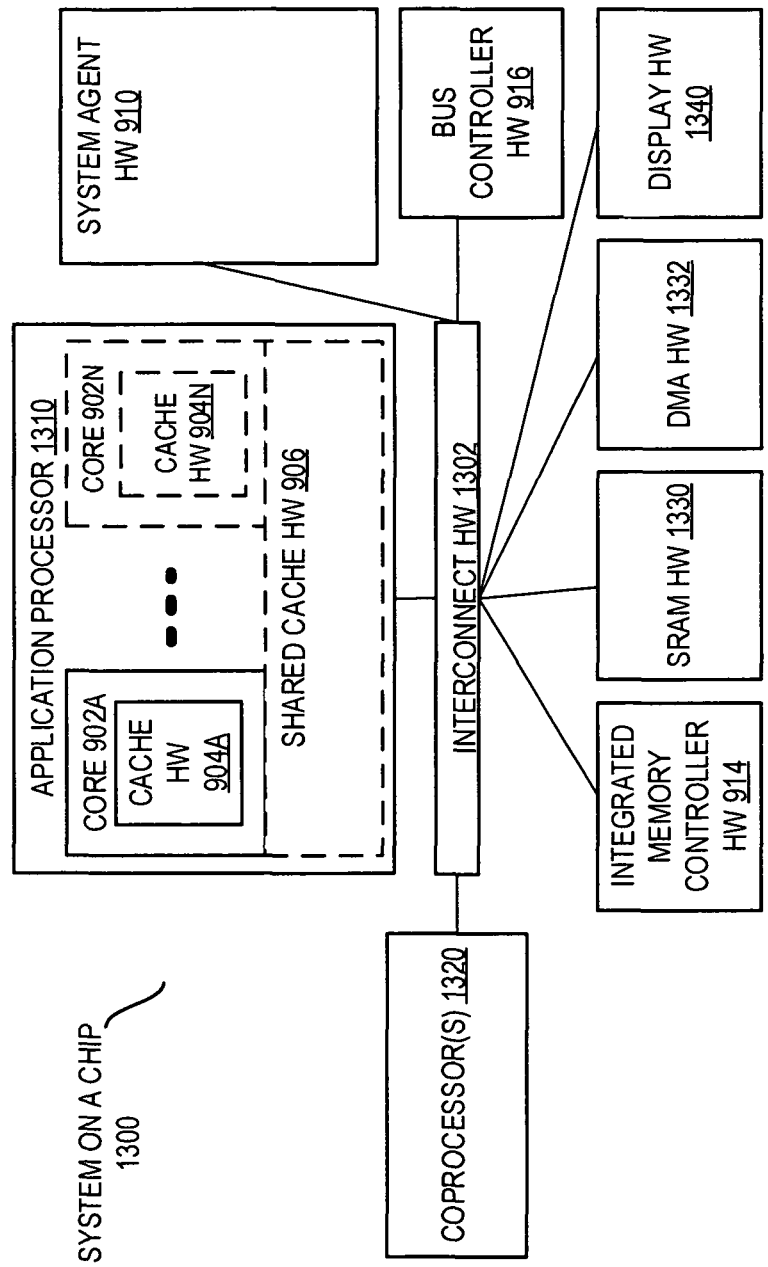
FIG. 13 illustrates a block diagram of a system on a chip (SoC) in accordance with an embodiment of the present invention.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect hardware 1302 is coupled to: an application processor 1310 which includes a set of one or more cores 902A-N and shared cache hardware 906; a system agent hardware 910; a bus controller hardware 916; an integrated memory controller hardware 914; a set or one or more coprocessors 1320 which may include integrated graphics logic, an image processor, an audio processor, and a video processor; an static random access memory (SRAM) hardware 1330; a direct memory access (DMA) hardware 1332; and a display hardware 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

What is claimed is:

1. An apparatus comprising:
   an execution circuit to execute a first load instruction;
   a detection circuit to detect when the first load instruction experiences a bad store-to-load forwarding event during execution;
   a prediction circuit coupled to the detection circuit to track occurrences of the bad store-to-load forwarding event experienced by the first load instruction during execution and to control enablement of an S-bit in the first load instruction based on the tracked occurrences;
   a splitter circuit coupled to receive the first load instruction, wherein the splitter circuit is configured to generate a plurality of load operations responsive to an enabled S-bit in first load instruction, wherein execution of the plurality of load operations by the execution hardware produces a result equivalent to that from the execution of the first load instruction.

2. The apparatus of claim 1, wherein a bad store-to-load forwarding event occurs for the first load instruction when a plurality of bytes accessed during execution of the first load instruction include at least a first byte updated responsive to a previous uncommitted store operation and also include at least a second byte not updated responsive to the previous uncommitted store operation.

3. The apparatus of claim 1, wherein a bad store-to-load forwarding event occurs for the first load instruction when a first plurality of bytes accessed during execution of the first load instruction differs in size than a second plurality of bytes updated responsive to a previous uncommitted store operation.

4. The apparatus of claim 1, wherein the prediction circuit to include a counter to track occurrences of the bad store-to-load forwarding event experienced by the first load instruction.

5. The apparatus of claim 4, wherein the prediction circuit to include a threshold to control the enablement of the S-bit in the first load instruction.

6. The apparatus of claim 5, wherein the prediction circuit to increment the counter for each occurrence of the bad store-to-forward event experienced by the first load instruction and to enable the S-bit in the first load instruction upon the counter exceeding the threshold.

7. A method comprising:
executing a first load instruction;
detecting when the first load instruction experiences a bad store-to-load forwarding event during execution;
tracking occurrences of the bad store-to-load forwarding event experienced by the first load instruction during execution;
controlling enablement of an S-bit in the first load instruction based on the tracked occurrences;
generating a plurality of load operations responsive to an enabled S-bit in first load instruction, wherein executing the generated plurality of load operations produces a result equivalent to that from the executing the first load instruction.

8. The method of claim 7, wherein the first load instruction experiences a bad store-to-load forwarding event when a plurality of bytes accessed during execution of the first load instruction include at least a first byte updated responsive to a previous uncommitted store operation and also include at least a second byte not updated responsive to the previous uncommitted store operation.

9. The method of claim 7, wherein the first load instruction experiences a bad store-to-load forwarding event when a plurality of bytes accessed during execution of the first load instruction differs in size than a second plurality of bytes updated responsive to a previous uncommitted store operation.

10. The method of claim 7, further comprises:
incrementing a counter for each occurrence of the bad store-to-forward event experienced by the first load instruction;
enabling the S-bit in the first load instruction upon the counter exceeding a threshold.

11. An apparatus comprising:
an annotation circuit to identify and annotate:
one or more speculatively-hoisted memory-accessing instructions, wherein a memory-accessing instruction is speculatively-hoisted if the memory-accessing instruction is reordered to be executed ahead of one or more memory-modifying instructions in a processor instruction pipeline;
a verifying instruction selected from one or more memory-modifying instructions over which the one or more memory-accessing instructions speculatively-hosted, the verifying instruction being a last instruction out of the one or more memory-modifying instructions in the processor instruction pipeline to be executed;
a detection circuit to detect whether the verifying instruction aliases with the one or more memory-accessing instructions, wherein aliasing occurs when the verifying instruction executes to memory addresses that are not distinct from memory addresses accessed by any of the one or more memory-accessing instructions;
a confirmation circuit coupled to track and confirm speculation of the one or more speculatively-hoisted memory-accessing instructions based on results from the detection circuit, wherein the confirmation circuit confirms the speculation when no aliasing is detected and rejects the speculation when aliasing is detected.

12. The apparatus of claim 11, wherein the verifying instruction is youngest of the one or more memory-modifying instructions in the processor instruction pipeline.

13. A method comprising:
identifying and annotating:
one or more speculatively-hoisted memory-accessing instructions, wherein a memory-accessing instruction is speculatively-hoisted if the memory-accessing instruction is reordered to be executed ahead of one or more memory-modifying instructions in a processor instruction pipeline;
a verifying instruction selected from one or more memory-modifying instructions over which the one or more memory-accessing instructions speculatively-hosted, the verifying instruction being a last instruction out of the one or more memory-modifying instructions in the processor instruction pipeline to be executed;
detecting whether the verifying instruction aliases with the one or more memory-accessing instructions, wherein aliasing occurs when the verifying instruction executes to memory addresses that are not distinct from memory addresses accessed by any of the one or more memory-accessing instructions;
confirming speculation of the one or more speculatively-hoisted memory-accessing instructions based on results from the aliasing detection, wherein the speculation is confirmed when no aliasing is detected and rejected when aliasing is detected.

14. The method of claim 13, further comprises selecting the youngest of the one or more memory-modifying instructions in the processor instruction pipeline as the verifying instruction.

* * * * *